(12) United States Patent
Pujari et al.

(10) Patent No.: US 7,919,040 B2
(45) Date of Patent: Apr. 5, 2011

(54) METHOD OF PREPARING PRESSURELESS SINTERED, HIGHLY DENSE BORON CARBIDE MATERIALS

(75) Inventors: Vimal K. Pujari, Northborough, MA (US); James T. Hennessey, Rutland, MA (US); William T. Collins, Auburn, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 129 days.

(21) Appl. No.: 12/221,916

(22) Filed: Aug. 7, 2008

(65) Prior Publication Data

US 2009/0047544 A1    Feb. 19, 2009

Related U.S. Application Data

(60) Provisional application No. 60/964,015, filed on Aug. 8, 2007.

(51) Int. Cl.
*B28B 3/00* (2006.01)
(52) U.S. Cl. ........................................... 264/669
(58) Field of Classification Search .................. 264/669
See application file for complete search history.

(56) References Cited

U.S. PATENT DOCUMENTS

| 4,195,066 | A | 3/1980 | Schwetz et al. |
| 4,524,138 | A | 6/1985 | Schwetz et al. |
| 4,718,941 | A | 1/1988 | Halverson et al. |
| 5,252,267 | A | 10/1993 | Holcombe et al. |
| 5,418,196 | A | 5/1995 | Niihara |
| 5,505,899 | A | 4/1996 | Sigl et al. |
| 5,668,068 | A | 9/1997 | Prochazka |

FOREIGN PATENT DOCUMENTS

| EP | 0 504 390 B1 | 1/1996 |
| EP | 0 494 390 B1 | 7/1996 |
| GB | 2 014 193 A | 8/1979 |
| WO | WO 01/98207 A1 | 12/2001 |
| WO | WO 2005/123626 A1 | 12/2005 |
| WO | WO 2006/069050 A2 | 6/2006 |

OTHER PUBLICATIONS

"Saint-Gobain Ceramics Product Offering: Typical Physical Properties," 5pp., (Feb. 2005).
Lee, H. and Speyer, R.F., "Hardness and Fracture Toughness of Pressureless-Sintered Boron Carbide ($B_4C$)," *J. Am. Ceram. Soc.*, 85(5): 1291-1293 (May 2002).
Schwetz, K.A. and Grellner, W., "The Influence of Carbon on the Microstructure and Mechanical Properties of Sintered Boron Carbide," *Journal of the Less-Common Metals*, 82: 37-47 (1981) (No month available).
International Search Report from International Application No. PCT/US2008/009484, 18 pp., Date Mailed: Sep. 29, 2009.
Notification Concerning Transmittal of International Preliminary Report on Patentability (Chapter 1 of the Patent Cooperation Treaty) for Int'l Application No. PCT/US2008/009484; Date Mailed: Feb. 18, 2010.

*Primary Examiner* — Matthew J Daniels
*Assistant Examiner* — Russell J Kemmerle, III
(74) *Attorney, Agent, or Firm* — Hamilton, Brook, Smith & Reynolds, P.C.

(57) ABSTRACT

In a method of preparing a boron carbide material, boron carbide powder is washed with essentially pure water at an elevated temperature to generate washed boron carbide powder. The washed boron carbide powder is combined with a sintering aid. The mixture of the boron carbide powder and the sintering aid is pressed to form a shaped material, and the shaped material is sintered. A sintered boron carbide material comprises a boron carbide component that includes boron carbide, elemental carbon, and not more than about 0.6 wt % of oxygen on the basis of the total weight of the boron carbide component. The sintered boron carbide material has a density of at least about 99% of the theoretical density. Another sintered boron carbide material comprises a boron carbide component that includes boron carbide, silicon carbide, elemental carbon, and not more than about 0.3 wt % oxygen on the basis of the total weight of the boron carbide component, and has a density of at least about 97% of the theoretical density.

17 Claims, No Drawings

METHOD OF PREPARING PRESSURELESS SINTERED, HIGHLY DENSE BORON CARBIDE MATERIALS

RELATED APPLICATION

This application claims the benefit of U.S. Provisional Application No. 60/964,015, filed on Aug. 8, 2007. The entire teachings of the above application are incorporated herein by reference.

BACKGROUND OF THE INVENTION

Boron carbide ($B_4C$) materials are great of interest as engineering ceramics for armor, wear resistant structural components, and as abrasives. Most applications of boron carbide materials require a high density which is close to the theoretical density (TD). Boron carbide materials generally have been made using either hot pressing techniques (i.e., sintering under high pressure) or pressureless sintering (i.e., sintering without applying pressure).

Typically, hot pressing processes are limited to relatively small and geometrically simple articles. Also, hot pressing processes generally are energy intensive and require additional molding materials.

Attempts have been made to replace hot pressing by pressureless sintering, to manufacture articles from a composite material including boron carbide. Pressureless sintering is advantageous compared to hot pressing with respect to process costs and ability of processing in a continuous mode and/or a scale-up to commercial production. Generally, it has been a challenge for conventional pressureless-sintering processes to obtain sintering densities of more than about 95% TD. Thus, there is a need for developing an improved pressureless-sintering process to manufacture high density boron carbide materials or products.

SUMMARY OF THE INVENTION

The present invention generally relates to a method of preparing a shaped, sintered boron carbide material or product, and to such a sintered boron carbide material or product.

In one aspect, the present invention is directed to a method of preparing a boron carbide material. In one embodiment, boron carbide powder is washed with essentially pure water at an elevated temperature to generate washed boron carbide powder. The washed boron carbide powder is combined with a sintering aid. The mixture of the boron carbide powder and the sintering aid is pressed to form a shaped material, and the shaped material is sintered.

In another embodiment, boron carbide powder is milled in an aqueous milling medium with a silicon carbide grit. The milled boron carbide powder is washed with essentially pure water at a temperature of between about 70° C. and about 90° C. to generate a washed boron carbide powder. The washed boron carbide powder is mixed with a carbon precursor in an amount equivalent to between about 1 wt % and about 5 wt % carbon on the basis of the weight of the boron carbide powder. The mixture of the washed boron carbide powder and the carbon precursor is dried to form a dried mixture. The dried mixture is pressed to thereby form a shaped material. The shaped material is sintered at a temperature in a range of between about 2,100° C. and about 2,500° C. under an inert atmosphere.

In another aspect, the present invention is directed to a sintered boron carbide material. In one embodiment, the sintered boron carbide material includes a boron carbide component that includes boron carbide, elemental carbon, and not more than about 0.6 wt % of oxygen on the basis of the total weight of the boron carbide component. The sintered boron carbide material has a density of at least about 99% of the theoretical density.

In yet another embodiment, the sintered boron carbide material includes a boron carbide component that includes boron carbide, silicon carbide, elemental carbon, and not more than about 0.3 wt % oxygen on the basis of the total weight of the boron carbide component. The sintered boron carbide material has a density of at least about 97% of the theoretical density.

Also included in the invention is a sintered boron carbide material made by the method of the invention described above.

The pressureless-sintering method of the invention permits the manufacture of complex shaped articles having relatively high density, e.g., greater than about 99% TD, without the need for expensive final machining operations or hot-pressing. If desired the sintered boron carbide may be Hot Isostatically Pressed (HIP) to near 100% density. In addition, the pressureless-sintering method of the invention can make possible mass production and continuous operation at a relatively low cost.

The sintered boron carbide materials of the invention have substantially low oxygen content, substantially high density and excellent mechanical strength (e.g., high fracture toughness, flexural strength and Weibull modulus), which is desirable for various applications, e.g., armor, use in the area of erosion technology, for example, as sandblasting nozzles or water jet nozzles. The sintered boron carbide materials of the invention also can be used as cutting materials, such as for machining Al—Si cast alloys.

DETAILED DESCRIPTION OF THE INVENTION

The method of preparing a sintered boron carbide material of the invention employs washing boron carbide powder with essentially pure water at an elevated temperature. The boron carbide powder suitable for use in the invention can be amorphous or crystalline. As used herein, "essentially pure water" means a liquid having at least 90 wt % of pure water ($H_2O$). Preferably, boron carbide powder is washed with at least 93 wt % pure water, more preferably with at least 95 wt % pure water. Optionally, the water for the washing process is degassed. As used herein, "elevated temperature" means a temperature greater than about 20° C. Preferably, the elevated temperature for washing of the boron carbide powder is in a range of between about 70° C. and about 90° C. More preferably, the elevated temperature for washing of the boron carbide powder is about 80° C. Preferably, the boron carbide powder is washed for between about 1 hour and about 3 hours. More preferably, the boron carbide powder is washed for about 2 hours.

The washed boron carbide powder is combined with a sintering aid. Any suitable sintering aid known in the art can be employed. Examples include any suitable carbon precursors, such as carbon-containing organic compounds (e.g., phenolic resins), and elemental carbon (carbon black or graphite). The sintering aid can be employed in any form that ensures a uniform distribution in the highly disperse mixture, for example as a particulate or colloid. Preferably, the sintering aid is a carbon precursor, such as a carbon-containing organic compound, which can be coked to form carbon at temperatures of, for example, up to about 1,000° C. More preferably, the carbon precursor decomposes at a temperature in a range of between about 100° C. and about 900° C.

Examples of such carbon precursors include phenolic resins, phenoplasts, coal-tar pitch and phenolformaldehyde condensation products of phenolic resins.

Preferably, the sintering aid mixed with the washed boron carbide powder is in an amount corresponding to between about 1 wt % and about 7 wt % carbon on the basis of the weight of the boron carbide powder. More preferably, the amount of the sintering aid mixed with the washed boron carbide powder corresponds to about 5 wt % carbon on the basis of the weight of the boron carbide powder. In one embodiment, the sintering aid is a phenolic resin. In a preferred embodiment, the amount of the phenolic resin combined with the boron carbide powder is in a range of between about 5 wt % and about 15 wt %, more preferably about 12 wt %, of the weight of the boron carbide powder. In a specific embodiment, an aqueous solution of the phenolic resin is combined with the washed boron carbide powder.

The mixture of the washed boron carbide powder and the sintering aid is dried employing any suitable method known in the art. Examples of suitable drying methods include freeze dry and spray dry. Preferably, the mixture is freeze dried.

A desired shape, such as a desired three-dimensional shape, of boron carbide can be formed by pressing the dried mixture of boron carbide powder and sintering aid. The shaping can be carried out according to any suitable known method, for example, by die-pressing, isostatic pressing, injection molding, extruding or slip casting. In the case of die-pressing in molds or isostatic pressing, a pressure of from 30 to 600 MPa, preferably from 100 to 500 MPa, is generally used. Any desired three-dimensional shape can be formed, for example, disks.

The shaped body of boron carbide is sintered to thereby form a corresponding sintered boron carbide material. Preferably, the sintering of the shaped boron carbide body is performed in the absence of external pressure. The pressure-less-sintering process can be carried out in any desired high-temperature furnace, such as a graphite-tube resistance furnace (Tammann furnace) or an induction-heating furnace having a graphite susceptor. For continuous operation, a horizontal pusher or band-type furnace can be employed, in which the preshaped boron carbide body is transported through the heating zone and, in such a manner, that each article is maintained at the desired end-temperature for a given period of time. The period of time for heating, the dwell time at the final temperature and the cooling are, in that operation, dependent on the size of the shaped material to be sintered. In a specific embodiment, the shaped boron carbide body is sintered at a temperature in a range of between about 2,100° C. and about 2,500° C., more preferably between about 2,100° C. and about 2,200° C., such as about 2,200° C. or about 2,180° C. Typically, the sintering process extends for about 1-5 hours, more typically for about 3-5 hours, such as for about 3 hours.

In one preferred embodiment, the shaped boron carbide body is pre-heated at a temperature in a range of between about 550° C. and about 650° C. prior to the sintering of the shaped boron carbide material.

Preferably, the sintering and/or optional pre-heating processes are performed under an inert atmosphere, such as under an argon or a nitrogen atmosphere. Alternatively, the sintering and/or optional pre-heating processes can be performed in vacuo.

Prior to the washing step, the boron carbide powder optionally is milled with essentially pure water. Preferably, the boron carbide powder is milled to have an average particle size less than about 2 microns, more preferably between about 0.1 microns and 1 micron, more preferably between about 0.3 microns and about 0.8 microns, even more preferably between about 0.5 microns and about 0.8 microns, such as about 0.6 microns. The average surface area of the milled boron carbide powder is preferably at least about 13 m$^2$/g, more preferably between about 13 m$^2$/g and about 20 m$^2$/g, such as about 15 m$^2$/g.

The milling can be done with any suitable grinding means. Preferably, the milling is done with a silicon carbide (SiC) grit. In one specific embodiment, the silicon carbide grit has a grit size of 500 to 2000 microns. In another specific embodiment, the milling process of boron carbide powder with a silicon carbide grit generates silicon carbide powder worn down from the grit along with milled boron carbide powder. The mixture is optionally screened with a filter to remove any remaining grit bigger than the threshold of the filter, for example, about 325 microns. The amount of silicon carbide powder can be controlled by adjusting parameters of the milling process, for example, milling time. Preferably, the amount of the silicon carbide powder is in a range of between about 5 wt % and about 28 wt %, more preferably between about 5 wt % and about 20 wt %, even more preferably between about 5 w % and about 15 wt % (e.g., about 10 wt %), of the total weight of the final boron carbide material.

Any suitable milling medium known in the art can be employed for the milling process. Preferably, the milling medium is an aqueous medium. In one specific embodiment, the aqueous medium includes about 80 wt % water on the basis of the total weight of the milling medium. In another specific embodiment, the aqueous medium includes water and an alcohol component, such as isopropyl alcohol. Preferably, a weight ratio of water to alcohol, such as methanol, ethanol, or isopropyl alcohol, is in a range of between about 3:1 and about 5:1, more preferably about 4:1. In a more specific embodiment, the milling medium includes about 80 wt % of water, about 20 wt % of alcohol, such as isopropyl alcohol, and about 1 wt % silane. In some other embodiments, a dry milling method is employed.

The present invention also includes a sintered boron carbide material. In one embodiment, the sintered boron carbide material includes a boron carbide component that includes boron carbide, elemental carbon and not more than about 0.6 wt % oxygen on the basis of the total weight of the boron carbide component. The sintered boron carbide material has a density of at least about 99% of the theoretical density (TD). Preferably, the oxygen content is not more than about 0.3 wt %, more preferably not more than about 0.15 wt %, on the basis of the total weight of the boron carbide component. In a preferred embodiment, the elemental carbon is present in an amount of between about 1 wt % and about 7 wt % carbon, more preferably between about 3 wt % and about 7 wt % carbon, even more preferably about 5 wt % carbon, on the basis of the total weight of the boron carbide component.

In another embodiment, the sintered boron carbide material comprises a boron carbide component that includes boron carbide, silicon carbide, elemental carbon and not more than about 0.3 wt % oxygen on the basis of the total weight of the boron carbide component, and has a density of at least about 97% TD. Preferably, the oxygen content is not more than about 0.15 wt % on the basis of the total weight of the boron carbide component. Preferably, the sintered boron carbide material has a density of at least about 98% TD, more preferably of at least about 99% TD. In a preferred embodiment, the silicon carbide is present in an amount of between about 5 wt % and about 28 wt %, more preferably between about 5 wt % and about 20 wt %, even more preferably between about 5 wt % and about 15 wt %, such as about 10 wt %, on the basis of the total weight of the boron carbide component. In another preferred embodiment, the elemental carbon is present in an amount of between about 1 wt % and about 7 wt % carbon, more preferably between about 3 wt % and about 7 wt % carbon, even more preferably about 5 wt % carbon, on the basis of the total weight of the boron carbide component.

The theoretical density (TD) can be calculated from the final phase component of the boron carbide product according to the law of mixtures. For example, TD of a mixture of A, B and C components is calculated by equation (1):

$$TD = \frac{100}{\frac{A\ wt\ \%}{density\ of\ A} + \frac{B\ wt\ \%}{density\ of\ B} + \frac{C\ wt\ \%}{density\ of\ C}} (g/cm^3). \quad (1)$$

Densities of boron carbide ($B_4C$), silicon carbide (SiC) and carbon (C) are about 2.5 $g/cm^3$, about 3.2 $g/cm^3$ and about 2.27 $g/cm^3$, respectively.

In a specific embodiment, the sintered boron carbide material has an average structural grain size of from about 3 to 12 microns.

In another specific embodiment, the sintered boron carbide material has fracture toughness of between about 2 MPa·minute$^{1/2}$ and about 4 MPa·minute$^{1/2}$, more preferably between about 2.5 MPa·minute$^{1/2}$ and about 3.5 MPa·minute$^{1/2}$. In a more specific embodiment, the hardness of the sintered boron carbide material is in a range of between about 15 GPa and about 30 GPa, more preferably between about 18 GPa and about 25 GPa. In another specific embodiment, the sintered boron carbide material has a modulus rupture value in a range of between about 300 and about 450 MPa, such as between about 350 MPa and about 400 MPa. In yet another specific embodiment, the sintered boron carbide material has a Weibull modulus value in a range of between about 6 and about 15, preferably between about 10 and about 15, such as between about 10 and about 12.

The low-oxygen-containing, sintered boron carbide materials of the invention can be made by the method of the invention described above. Without being bound to a particular theory, the washing process of boron carbide powder, or milled boron carbide powder mixed with silicon carbide powder, at an elevated temperature can substantially reduce the oxygen content of the final product, probably, at least in part, by removing $B_2O_3$ from boron carbide powder surfaces.

EXEMPLIFICATION

Example 1

Preparation of Sintered Boron Carbide Discs

A boron carbide powder (Dalian Jinma, China), having average particle size (D50) and average surface area (SA) of 6.0 microns and 4 $m^2/g$ respectively, and having oxygen content of 1.5 wt %, was attrition milled using a SiC grit. An aqueous medium consisted of 80 wt % water, 20 wt % isopropyl alcohol and 1 wt % silane (Dow Corning Z6040) was used for the milling process. The boron carbide powder was milled to have the desired D50 of 0.6 microns and SA of at least 13.0 $m^2/g$. Analysis of the milled powder showed up to 10 wt % SiC addition through the attrition of the SiC grinding media. The milled boron carbide powder was then treated with 80° C. hot water for 2 hours in order to leach out $B_2O_3$ on surfaces of the milled boron carbide powder.

To the washed boron carbide powder was added an aqueous solution of 12 wt % phenolic resin (equivalent of 5 wt % carbon). The mixture was then freeze dried. The freeze dried, washed boron carbide powder was pressed at 18 Ksi into 1" diameter×0.5" thick discs. The discs were sintered at 2,180° C. for 3 hours in an argon gas environment achieving a sintered density of greater than 99% TD.

Under the identical pressing and sintering conditions, boron carbide powder that had not gone through the washing process only provided a sintered density of 90.2% TD. Thus, an about 10% increase in sintered density was achieved by washing boron carbide powder with hot water.

An oxygen analysis of the boron carbide powder at various stages was made by the Leco technique known in the art. Oxygen contents of boron carbide powder in various stages are summarized in Table 1 below:

TABLE 1

| Oxygen Content of Boron Carbide Powder | | | | |
|---|---|---|---|---|
| Powder | As received, 4 $m^2/g$ | Milled in water, 15 $m^2/g$ | Milled in water and then washed with hot water | Hot-water washed powder with 5 wt % carbon, sintered at 2180° C. |
| Oxygen Content (wt %) | 1.5 | 3.41 | 2.04 | 0.131 |

As shown above, after milling in water, the oxygen content of boron carbide powder went up (by about 100%) probably due to increased surface area. The hot water washing (leaching) treatment of the milled boron carbide powder significantly reduced the oxygen content by about 40%. After sintering to have about 99% TD, the oxygen content was lowered to 0.131 wt %.

Example 2

Comparison of the Method of the Invention Employing the Hot-water Washing Step to the Method that does not Employ Such Washing Step Discs of boron carbide were prepared in a similar manner as described above in Example 1, but with different combinations of the milling, drying, and washing steps as specified in Table 2. Each of the boron carbide discs contained about 5 wt % elemental carbon based on the total weight of the disc, which was introduced during its preparation processes. Sintering conditions, oxygen content, SA and D50, and certain mechanical properties of the final products are summarized in Table 2.

TABLE 2

Specifications of Pressureless-Sintered Boron Carbide Products

| Powder | Total C (wt %) Milled | Oxygen Content (wt %) of Milled Powder | SA (m$^2$/g)/ D50 (μm) of Milled Powder | Processing | Sintered Density (% TD) | Sintering Condition (° C./Hr) | Hardness (GPa) | Fracture Toughness (MPa · min$^{1/2}$) |
|---|---|---|---|---|---|---|---|---|
| Starck HS NRFC | 25.4 | 4.31 | 16/0.8 | Aqueous Milling, Freeze Dry or Spray Dry | 98.5 | 2180/3 | 20.1 | 3.61 |
| Chinese-I | 23.4 | 5.25 | 15.8/0.63 | Aqueous Milling, Spray Dry | 90.5 | 2200/3 | 26.2 | 1.8 |
| Chinese-II | 26.3 | 5.66 | 15/0.59 | Aqueous plus IPA Milling$^a$, Spray Dry | 92.0 | 2200/3 | 26.4 | 2.2 |
| UK Milled NRDC | 24.0 | 6.5 | 15/0.5 | Aqueous Milling, Freeze Dry or Spray Dry | 90.2 | 2180/3 | 11.7 | 3.3 |
| UK Milled NRDC (Invention A) | 24.9 | 3.19 | 15/0.5 | Aqueous Milling, Washing, Freeze Dry | 97.0 | 2200/3 | 18 | 2.8 |
| UK Milled NRDC (Invention B) | 24.9 | 3.19 | 15/0.5 | Aqueous Milling, Washing, Freeze Dry | 97.5 | 2200/3 | 22.6 | 2.4 |
| Chinese-III (Invention C) | 25.8 | 2.91 | 13.0/0.6 | Aqueous plus IPA Milling$^a$, Washing, Freeze Dry | >99 | 2200/3 | 24 | 2.8 |

$^a$water: IPA (isopropyl alcohol) = 8:2 (wt ratio).

Example 3

Mechanical Properties of the Sintered Boron Carbide Product

A sintered boron carbide product containing 14 wt % SiC was prepared as described in Example 1. Certain mechanical properties of the product are summarized in Table 3. As a comparison, certain mechanical properties, as reported in the literature, of a hot pressed boron carbide product are also summarized in the table. The hot pressed products are generally prepared using a unwashed powder but similar amount of carbon (as example 1) as sintering aid. Hardness was measured by Vickers indentation method using 2 Kg. load. Fracture toughness was determined by Indentation Crack Length method described by Chantikulet et al. The four point flexure strength was measured using ASTM MIL Spec 1982 procedure.

As shown in the table, the pressureless-sintered product of the invention exhibited substantially high density and excellent mechanical strength (e.g., high fracture toughness, flexural strength and Weibull modulus), which were comparable with the hot pressed product. These results indicate that the pressureless-sintering process of the invention can permit the manufacture of complex shaped articles having relatively high density, e.g., greater than about 99% TD, without the need for expensive final machining operations or hot-pressing.

TABLE 3

Mechanical Properties of the Sintered Boron Carbide Product

| Material | Density (g/cc) | % TD | Hardness (GPa) | Fracture Toughness (MPa · min$^{1/2}$) | Modulus of Rupture (MPa) | Weibull Modulus |
|---|---|---|---|---|---|---|
| Hot Pressed | 2.5 | >99 | 27 | 2.0 | 390-425 | 6-8 |
| Pressureless-Sintered Product of the Invention | 2.56 | 98.5 | 24 | 2.8 | 350-400 | 10-12 |

EQUIVALENTS

While this invention has been particularly shown and described with references to example embodiments thereof, it will be understood by those skilled in the art that various changes in form and details may be made therein without departing from the scope of the invention encompassed by the appended claims.

What is claimed is:

1. A method of preparing a boron carbide material, comprising the steps of:
   a) washing boron carbide powder with essentially pure water at a temperature in a range of between about 70° C. and about 90° C. to generate washed boron carbide powder;
   b) combining a sintering aid with the washed boron carbide powder;
   c) pressing the mixture to thereby form a desired shaped material; and
   d) sintering the shaped material.

2. The method of claim 1, wherein the temperature for the washing of the boron carbide powder is about 80° C.

3. The method of claim 1, wherein the boron carbide powder is washed for between about 1 hour and about 3 hours.

4. The method of claim 3, wherein the boron carbide powder is washed for about 2 hours.

5. The method of claim 1, wherein the sintering aid is added to the boron carbide powder in an amount corresponding to between about 1 wt % and about 7 wt % carbon on the basis of the weight of the boron carbide powder.

6. The method of claim 5, wherein the sintering aid is added to the boron carbide powder in an amount corresponding to about 5 wt % carbon on the basis of the weight of the boron carbide powder.

7. The method of claim 5, wherein the sintering aid is a phenolic resin.

8. The method of claim 7, wherein an aqueous solution of the phenolic resin is combined with the washed boron carbide powder.

9. The method of claim 7, wherein the phenolic resin combined with the boron carbide powder in an amount of about 12 wt % of the weight of the boron carbide powder.

10. The method of claim 1, wherein the sintering of the shaped material is performed in the absence of external pressure.

11. The method of claim 1, wherein the shaped material is sintered at a temperature in a range of between about 2,100° C. and about 2,500° C.

12. The method of claim 11, wherein the shaped material is sintered at a temperature in a range of between about 2,100° C. and about 2,200° C.

13. A method of preparing a boron carbide material, comprising the steps of:
   a) milling a boron carbide powder in an aqueous milling medium with a silicon carbide grit;
   b) washing the milled boron carbide powder with essentially pure water at a temperature of between about 70° C. and 90° C. to generate a washed boron carbide powder;
   c) combining a carbon precursor with the washed boron carbide powder, the carbon precursor being in an amount equivalent to between about 1 wt % and about 5 wt % carbon on the basis of the weight of the boron carbide powder;
   d) drying the mixture of the washed boron carbide powder and the carbon precursor to form a dried mixture;
   e) pressing the dried mixture to thereby form a desired shaped material; and
   f) sintering the shaped material at a temperature in a range of between about 2100° C. and about 2500° C. under an inert atmosphere.

14. The method of claim 13, wherein the carbon precursor is a phenolic resin.

15. The method of claim 14, wherein the phenolic resin is added in an amount of about 12 wt % on the basis of the weight of the boron carbide powder.

16. The method of claim 15, wherein the aqueous milling medium includes water and isopropyl alcohol, a weight ratio of water: isopropyl alcohol being in a range of between about 3:1 and about 5:1.

17. The method of claim 13, further including the step of pre-heating the shaped material at a temperature in a range of between about 550° C. and about 650° C. prior to the sintering the shaped material.

* * * * *